United States Patent
Liu et al.

(10) Patent No.: US 10,434,620 B2
(45) Date of Patent: Oct. 8, 2019

(54) HIGH-PRECISION WHEEL RIM BURR REMOVING DEVICE

(71) Applicant: CITIC Dicastal CO.,LTD., Qinhuangdao, Hebei (CN)

(72) Inventors: Huiying Liu, Qinhuangdao (CN); Hao Wu, Qinhuangdao (CN); Dong Guo, Qinhuangdao (CN)

(73) Assignee: CITIC Dicastal CO., LTD., Qinhuangdao, Hebei (CN)

( * ) Notice: Subject to any disclaimer, the term of this patent is extended or adjusted under 35 U.S.C. 154(b) by 99 days.

(21) Appl. No.: 15/801,420

(22) Filed: Nov. 2, 2017

(65) Prior Publication Data

US 2019/0061092 A1 Feb. 28, 2019

(30) Foreign Application Priority Data

Aug. 31, 2017 (CN) .......................... 2017 1 0776225

(51) Int. Cl.
*B24B 27/00* (2006.01)
*B23B 5/00* (2006.01)
(Continued)

(52) U.S. Cl.
CPC .............. *B24B 27/003* (2013.01); *B23B 5/00* (2013.01); *B24B 27/0076* (2013.01);
(Continued)

(58) Field of Classification Search
CPC ..... B23C 3/12; B23C 3/122; B23C 2215/085; B23C 2220/20; B23C 2220/16; B23C 2220/68; B23B 2215/08; B23B 2220/08; B23B 2220/04; B23B 2220/52; B23Q 3/062; B23Q 7/005; B23Q 7/05; B23Q 7/18; B23Q 17/2233; B23Q 17/2283; B26D 3/02; B24B 27/003; B24B 27/0061; B24B 27/0076; G05B 19/402
See application file for complete search history.

(56) References Cited

U.S. PATENT DOCUMENTS 3,952,630 A * 4/1976 Fencl .................. B23C 3/12
409/140
2011/0068544 A1 * 3/2011 Prust ................. B23B 31/16275
279/4.02
(Continued)

FOREIGN PATENT DOCUMENTS

CN 202877657 U * 4/2013
CN 103658831 A * 3/2014
(Continued)

*Primary Examiner* — Ryan C Rufo
(74) *Attorney, Agent, or Firm* — Cooper Legal Group, LLC

(57) ABSTRACT

A high-precision wheel rim burr removing device is composed of a rack, a base, longitudinal guide rails, a longitudinal servo motor, a first ball screw, a longitudinal moving plate, a transverse servo motor, transverse guide rails, a second ball screw and the like. A wheel is initially positioned and clamped by adopting the central hole, then the coaxiality deviation of the center hole and cap sections is eliminated, and the rotating center of the burr part of the outer rim is superposed with the rotating centers of cutters, so that high-precision burr removal is realized. The device has the characteristics of advanced process, stability, high efficiency, high degree of automation and the like.

1 Claim, 5 Drawing Sheets

(51) Int. Cl.
   *B21D 53/30*    (2006.01)
   *B23Q 7/00*     (2006.01)
(52) U.S. Cl.
   CPC .......... *B21D 53/30* (2013.01); *B23B 2215/08* (2013.01); *B23B 2220/08* (2013.01); *B23C 2215/085* (2013.01); *B23C 2220/20* (2013.01); *B23C 2270/12* (2013.01); *B23Q 7/005* (2013.01)

(56) References Cited

U.S. PATENT DOCUMENTS

| | | | | |
|---|---|---|---|---|
| 2012/0073413 | A1* | 3/2012 | Len .......................... | B23B 5/00 82/104 |
| 2015/0273588 | A1* | 10/2015 | Bowen .................... | B23B 5/28 82/104 |
| 2016/0107247 | A1* | 4/2016 | Li ............................ | B23C 3/12 407/42 |
| 2016/0346844 | A1* | 12/2016 | Xue ......................... | B23B 5/28 |
| 2018/0001695 | A1* | 1/2018 | Liu .......................... | B23B 7/12 |
| 2018/0333783 | A1* | 11/2018 | Zheng ................... | B23Q 3/062 |
| 2018/0361527 | A1* | 12/2018 | Liu .......................... | B24B 5/44 |

FOREIGN PATENT DOCUMENTS

| | | | | | |
|---|---|---|---|---|---|
| DE | 3139825 | A1 | * | 8/1983 | ............... B23C 3/18 |
| DE | 4434950 | A1 | * | 4/1996 | ............... B08B 1/04 |
| DE | 19925820 | A1 | * | 12/2000 | ........... B22D 31/002 |
| DE | 202012011628 | U1 | * | 1/2013 | ............... B23C 3/12 |
| DE | 102014010877 | A1 | * | 1/2016 | .......... B23B 39/003 |
| EP | 2052811 | A1 | * | 4/2009 | ............ B23B 3/265 |
| JP | 05285800 | A | * | 11/1993 | |

* cited by examiner

HIGH-PRECISION WHEEL RIM BURR REMOVING DEVICE

CROSS-REFERENCE TO RELATED APPLICATIONS

The present application claims benefit of Chinese Patent Application No. 201710776225.X, filed on Aug. 31, 2017, the contents of which are hereby incorporated by reference in its entirety.

BACKGROUND

After wheel machining, a ring of burrs may remain at the outer rim, and if the burrs are not removed uniformly, the fillets of the ring of outer rim are not consistent in size and corrosion is easily caused, so it is urgently needed to improve the burr removing precision to ensure that the fillets are uniform after burrs are removed from the outer rim. At present, a wheel is mostly machined by adopting two turning procedures, the first lathe turning is used for machining the inner rim, the central hole, the flange surface and the spoke back cavity, then the wheel is clamped onto the second lathe, and the second lathe turning is used for turning cap sections and the outer rim. It can be known from process analysis that the first turning and the second turning adopt two lathes, so coaxiality deviation exists, i.e., the central hole machined by the first procedure and the cap sections and outer rim machined by the second procedure have coaxiality deviation, which is generally 0.1-0.5 mm Therefore, in order to realize high-precision burr removal, the coaxiality deviation needs to be eliminated, so that the rotating center of the burr part of the outer rim is superposed with the rotating centers of cutters, and then the fillets are uniform after burrs are removed from the outer rim.

SUMMARY

The disclosure relates to the technical field of burr cleaning after wheel machining, specifically to a device for removing burrs at the outer rim of a wheel with high precision.

The disclosure is aimed at providing a high-precision wheel rim burr removing device, which can be used for automatic continuous production to improve the burr removing precision and reduce the corrosion risk.

A high-precision wheel rim burr removing device is composed of a rack, a base, longitudinal guide rails, a longitudinal servo motor, a first ball screw, a longitudinal moving plate, a transverse servo motor, transverse guide rails, a second ball screw, a transverse moving plate, a lifting cylinder, guide posts, guide sleeves, a lifting platform, an expansion cylinder, a flange plate, an expansion sleeve, an expansion core, a supporting plate, a positioning guide rail, a positioning cylinder, a left sliding table, a right sliding table, a gear rack, positioning wheels, a servo motor, a rotating disk, a left guide rail, a left sliding block, a left cylinder, a left motor, a left cutter head, a right guide rail, a right sliding block, a right cylinder, a right motor, a right cutter head, an electric cylinder and a circle center detection probe.

The positioning guide rail is mounted on the supporting plate, the left sliding table and the right sliding table are symmetrically mounted on the positioning guide rail and connected via the gear rack, the output end of the positioning cylinder is connected with the left sliding table, the positioning wheels are symmetrically mounted on the left sliding table and the right sliding table, when a wheel arrives at the device along a roller bed, the positioning cylinder is started, the left sliding table and the right sliding table move synchronously, the four positioning wheels can initially position the wheel, and this is an initial wheel positioning system.

The base is mounted at the bottom of the rack, the two longitudinal guide rails are mounted on the base, the longitudinal moving plate is mounted on the longitudinal guide rails, and the first ball screw is mounted below the longitudinal moving plate. The output end of the longitudinal servo motor is connected with the first ball screw, thus controlling longitudinal movement of the longitudinal moving plate. The two transverse guide rails are mounted on the longitudinal moving plate, the transverse moving plate is mounted on the transverse guide rails, and the second ball screw is mounted below the transverse moving plate. The output end of the transverse servo motor is connected with the second ball screw, thus controlling transverse movement of the transverse moving plate, and this is a coaxiality deviation correction system.

The lifting cylinder and the four guide posts are mounted on the transverse moving plate, and the output end of the lifting cylinder is connected with the lifting platform to control ascending and descending of the lifting platform. The expansion cylinder and the flange plate are fixed on the lifting platform, the output end of the expansion cylinder is connected with the expansion core, the expansion core is matched with the expansion sleeve, the upper end face of the flange plate is attached to a wheel flange for axial positioning, and the expansion sleeve is matched with the central hole of the wheel and used for radial positioning and expansion of the wheel.

The servo motor is mounted at the top of the rack, the output end of the servo motor is connected with the rotating disk, the left guide rail and the right guide rail are symmetrically mounted on the rotating disk, the left sliding block and the right sliding block are symmetrically mounted on the guide rails, the left cylinder and the right cylinder are symmetrically fixed on the rotating disk, the output end of the left cylinder is connected with the left sliding block, and the output end of the right cylinder is connected with the right sliding block. The left motor is mounted on the left sliding block, the output end of the left motor is connected with the left cutter head, four rim burr cutters are circumferentially and uniformly distributed on the left cutter head, and the cutting edge fillets of the burr cutters are respectively R2, R2.5, R3 and R3.5; and the right motor is mounted on the right sliding block, the output end of the right motor is connected with the right cutter head, four rim burr cutters are circumferentially and uniformly distributed on the right cutter head, and the cutting edge fillets of the burr cutters are respectively R2, R2.5, R3 and R3.5. According to the requirements of different outer rim fillets, the same matched cutting edges are selected on the left and right sides to remove burrs, and the left cutter head and the right cutter head jointly constitute a rim burr removing cutter system. The electric cylinder is mounted right below the rotating disk, and the circle center detection probe is mounted at the output end of the electric cylinder and used for detecting the circle center of the cap section part.

The working process of the device is: when a wheel arrives at the device along the roller bed, the positioning cylinder is started, the left sliding table and the right sliding table move synchronously, and the four positioning wheels can initially position the wheel; when the wheel is initially positioned, the positioning wheels are withdrawn and reset;

then the lifting cylinder is started to drive the flange plate and the expansion sleeve to ascend; when the flange plate contacts the flange surface of the wheel, the expansion cylinder is started, the expansion core drives the expansion sleeve to expand, and the wheel is positioned and clamped based on the flange surface of the central hole. Next, the lifting cylinder drives the wheel to continue ascending and leave the roller bed, the wheel stops moving after ascending to a certain height, at the moment, the electric cylinder is started to drive the circle center detection probe to descend to the interior of the cap section of the wheel, and the circle center detection probe is reset after detecting the position of the circle center; then a computer calculates the coaxiality deviation between the axis of the central hole and the axis of the cap section, the transverse deviation value and the longitudinal deviation value are fed back to the coaxiality correction system, the central axes of the cap sections of the wheel are adjusted via the longitudinal servo motor and the transverse servo motor to superpose with the rotating centers of the cutters, and when the central axes of the cap sections of the wheel are superposed with the rotating centers of the cutters, the rotating center of the burr part of the outer rim of the wheel is also superposed with the rotating centers of the cutters, so that high-precision positioning is realized. Next, the servo motor is started to drive the cutter system to rotate, the lifting cylinder is continuously started to drive the wheel to ascend to an appropriate height, and the burr part of the outer rim contacts the fillet cutting edges of the burr cutters to remove burrs.

According to the disclosure, the wheel is initially positioned and clamped by adopting the central hole, then the coaxiality deviation of the center hole and the cap sections is eliminated, and the rotating center of the burr part of the outer rim is superposed with the rotating centers of the cutters, so that high-precision burr removal is realized. The device has the characteristics of advanced process, stability, high efficiency, high degree of automation and the like.

Figure 1:
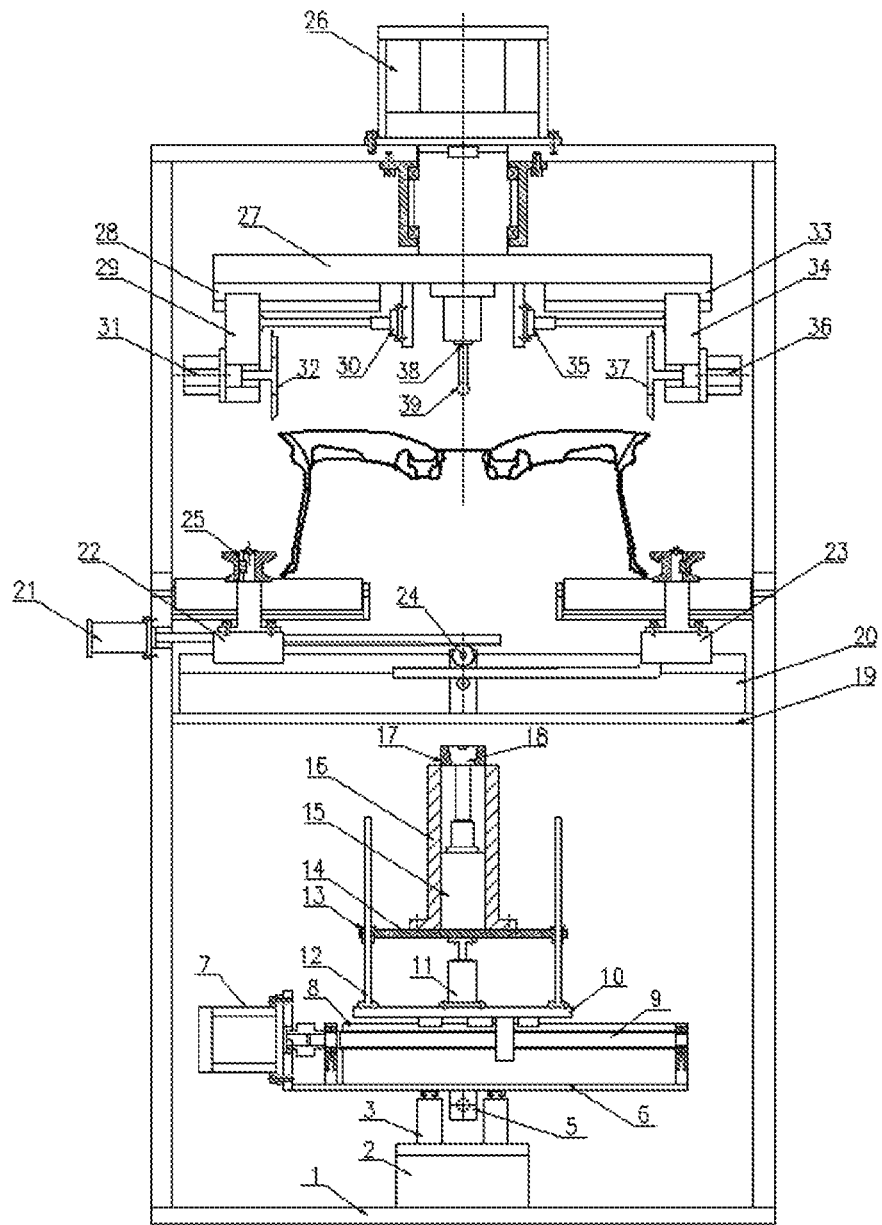
FIG. 1 is a front view of a high-precision wheel rim burr removing device of the disclosure.
Figure 2:
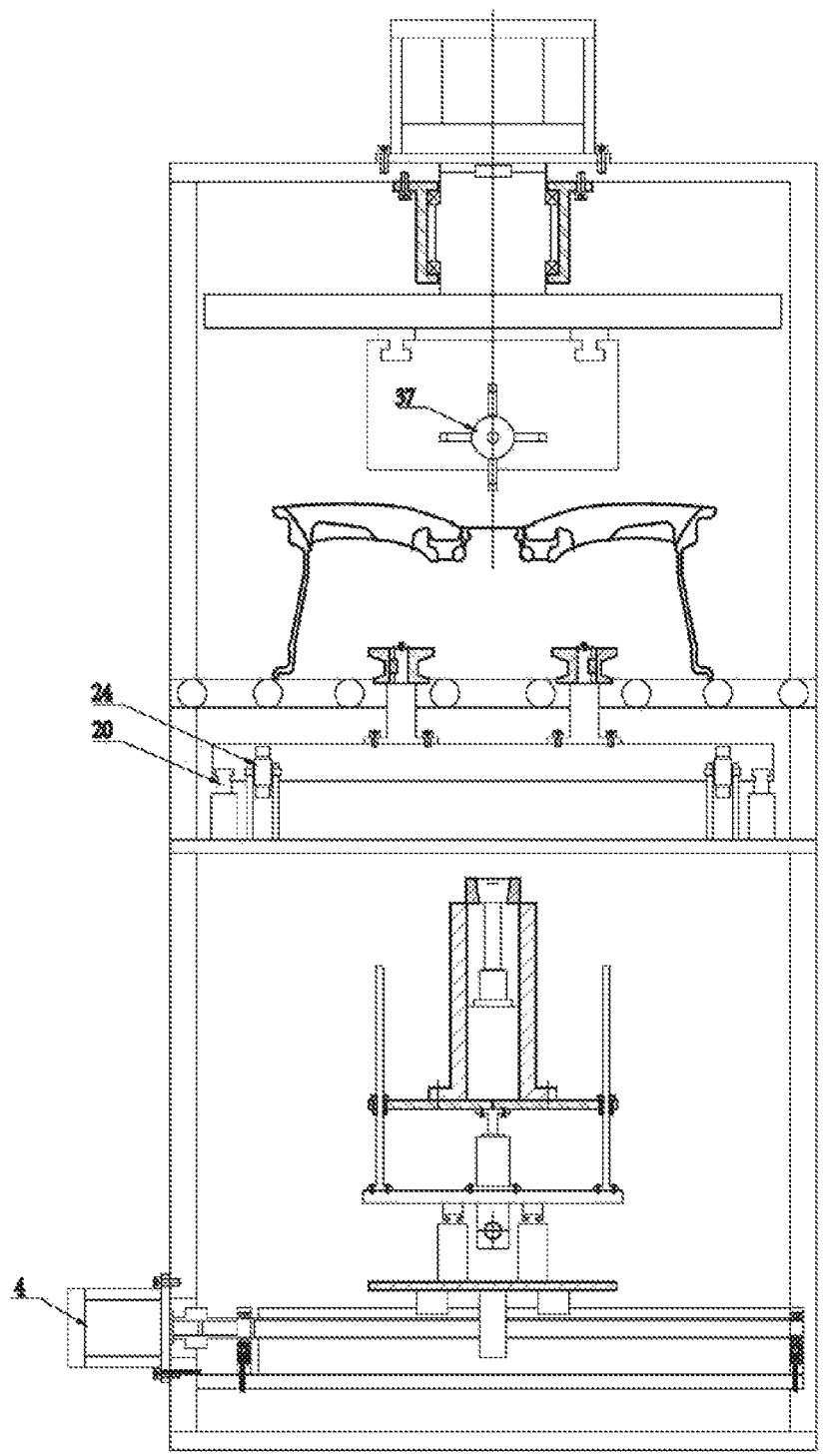
FIG. 2 is a left view of the high-precision wheel rim burr removing device of the disclosure.
Figure 3:
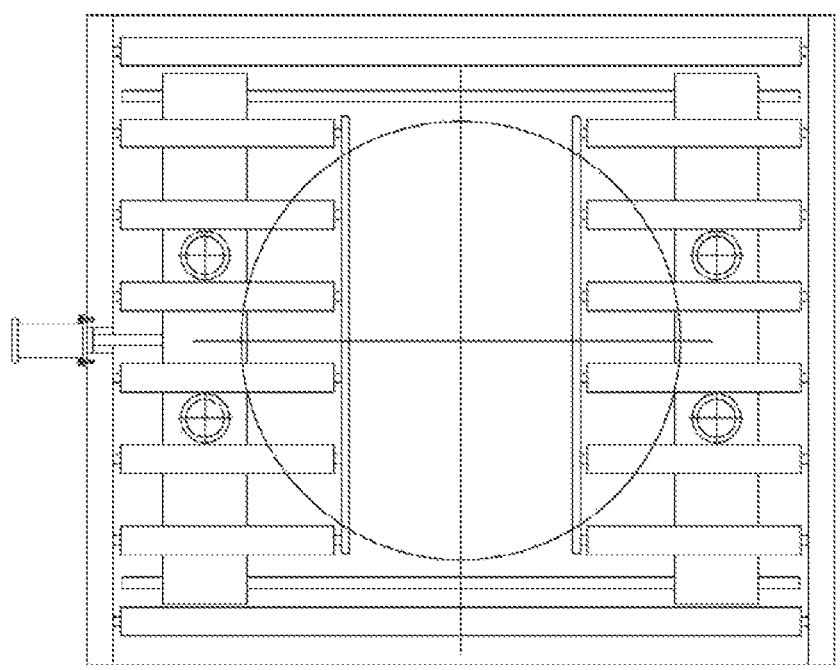
FIG. 3 is a top view of the high-precision wheel rim burr removing device of the disclosure.
Figure 4:
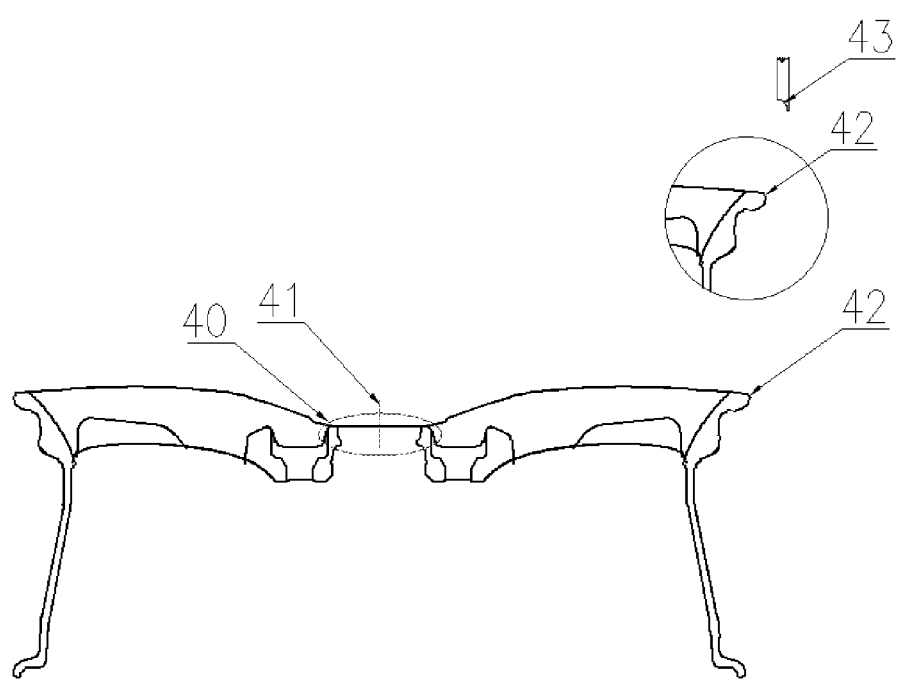
FIG. 4 is a schematic view of a cap section part and a rim of a wheel.
Figure 5:
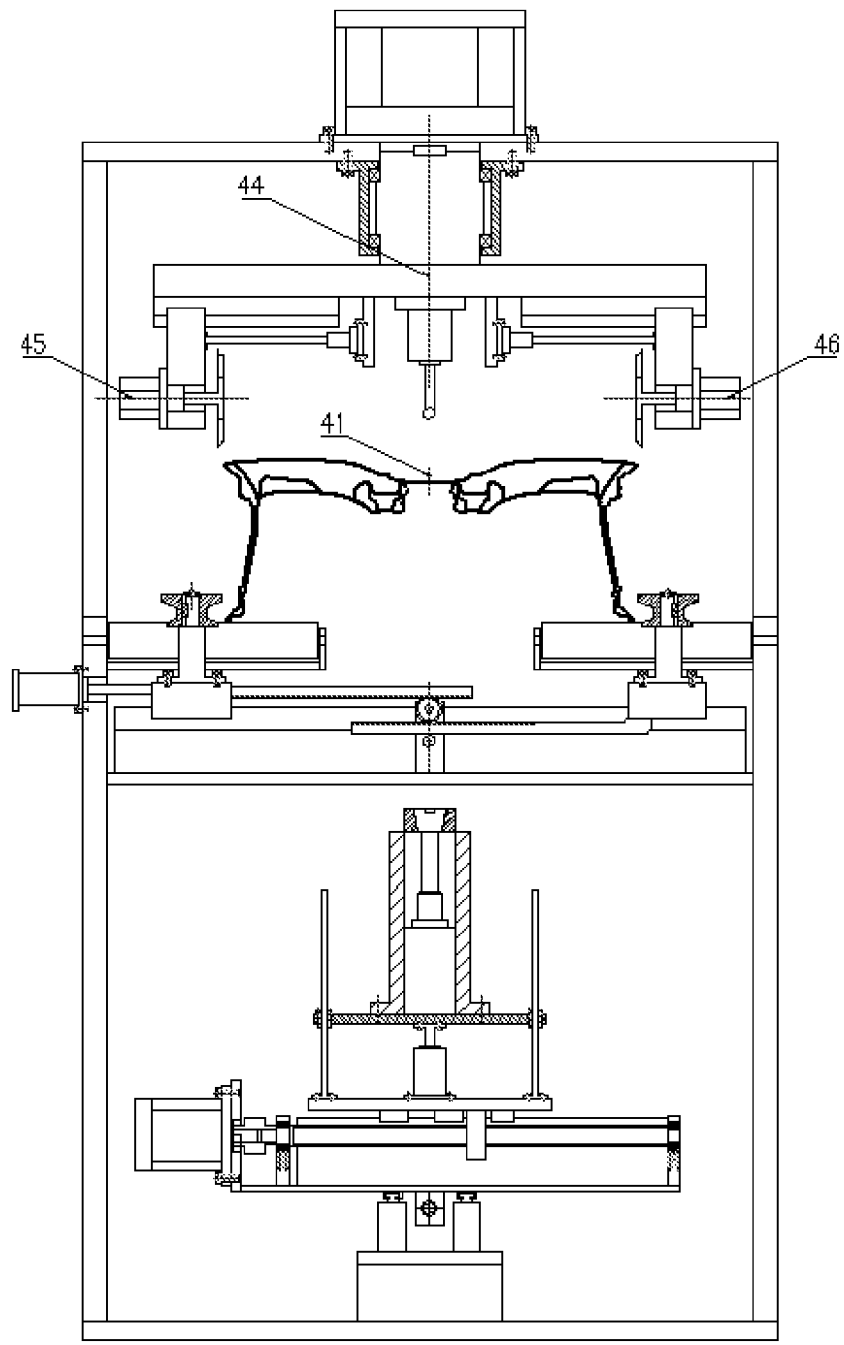
FIG. 5 is a schematic view of a rotating center of cutters.

LIST OF REFERENCE SYMBOLS 1 rack
2 base
3 longitudinal guide rail
4 longitudinal servo motor
5 first ball screw
6 longitudinal moving plate
7 transverse servo motor
8 transverse guide rail
9 second ball screw
10 transverse moving plate
11 lifting cylinder
12 guide post
13 guide sleeve
14 lifting platform,
15 expansion cylinder,
16 flange plate
17 expansion sleeve
18 expansion core
19 supporting plate
20 positioning guide rail
21 positioning cylinder
22 left sliding table
23 right sliding table
24 gear rack
25 positioning wheel
26 servo motor
27 rotating disk
28 left guide rail
29 left sliding block
30 left cylinder
31 left motor
32 left cutter head
33 right guide rail
34 right sliding block
35 right cylinder
36 right motor
37 right cutter head
38 electric cylinder
39 circle center detection probe
40 cap section part
41 central axis of the cap section part
42 outer rim fillet of a wheel
43 cutting edge fillet of a burr cutter
44 rotating center of cutters
45 rotating center of left cutter head
46 rotating center of right cutter head

DETAILED DESCRIPTION

Details and working conditions of a specific device provided by the disclosure will be given below in combination with the accompanying drawings.

A high-precision wheel rim burr removing device is composed of a rack 1, a base 2, longitudinal guide rails 3, a longitudinal servo motor 4, a first ball screw 5, a longitudinal moving plate 6, a transverse servo motor 7, transverse guide rails 8, a second ball screw 9, a transverse moving plate 10, a lifting cylinder 11, guide posts 12, guide sleeves 13, a lifting platform 14, an expansion cylinder 15, a flange plate 16, an expansion sleeve 17, an expansion core 18, a supporting plate 19, a positioning guide rail 20, a positioning cylinder 21, a left sliding table 22, a right sliding table 23, a gear rack 24, positioning wheels 25, a servo motor 26, a rotating disk 27, a left guide rail 28, a left sliding block 29, a left cylinder 30, a left motor 31, a left cutter head 32, a right guide rail 33, a right sliding block 34, a right cylinder 35, a right motor 36, a right cutter head 37, an electric cylinder 38 and a circle center detection probe 39.

The positioning guide rail 20 is mounted on the supporting plate 19, the left sliding table 22 and the right sliding table 23 are symmetrically mounted on the positioning guide rail 20 and connected via the gear rack 24, the output end of the positioning cylinder 21 is connected with the left sliding table 22, the positioning wheels 25 are symmetrically mounted on the left sliding table 22 and the right sliding table 23, when a wheel arrives at the device along a roller bed, the positioning cylinder 21 is started, the left sliding table 22 and the right sliding table 23 move synchronously, the four positioning wheels 25 can initially position the wheel, and this is an initial wheel positioning system.

The base 2 is mounted at the bottom of the rack 1, the two longitudinal guide rails 3 are mounted on the base 2, the longitudinal moving plate 6 is mounted on the longitudinal guide rails 3, and the first ball screw 5 is mounted below the longitudinal moving plate 6. The output end of the longitudinal servo motor 4 is connected with the first ball screw 5, thus controlling longitudinal movement of the longitudinal moving plate 6. The two transverse guide rails 8 are mounted on the longitudinal moving plate 6, the transverse moving plate 10 is mounted on the transverse guide rails 8, and the second ball screw 9 is mounted below the transverse moving plate 10. The output end of the transverse servo motor 7 is connected with the second ball screw 9, thus controlling transverse movement of the transverse moving plate 10, and this is a coaxiality deviation correction system.

The lifting cylinder 11 and the four guide posts 12 are mounted on the transverse moving plate 10, and the output end of the lifting cylinder 11 is connected with the lifting platform 14 to control ascending and descending of the lifting platform 14. The expansion cylinder 15 and the flange plate 16 are fixed on the lifting platform 14, the output end of the expansion cylinder 15 is connected with the expansion core 18, the expansion core 18 is matched with the expansion sleeve 17, the upper end face of the flange plate 16 is attached to a wheel flange for axial positioning, and the expansion sleeve 17 is matched with the central hole of the wheel and used for radial positioning and expansion of the wheel.

The servo motor 26 is mounted at the top of the rack 1, the output end of the servo motor 26 is connected with the rotating disk 27, the left guide rail 28 and the right guide rail 33 are symmetrically mounted on the rotating disk 27, the left sliding block 29 and the right sliding block 34 are symmetrically mounted on the guide rails, the left cylinder 30 and the right cylinder 35 are symmetrically fixed on the rotating disk 27, the output end of the left cylinder 30 is connected with the left sliding block 29, and the output end of the right cylinder 35 is connected with the right sliding block 34. The left motor 31 is mounted on the left sliding block 29, the output end of the left motor 31 is connected with the left cutter head 32, four rim burr cutters are circumferentially and uniformly distributed on the left cutter head 32, and the cutting edge fillets 43 of the burr cutters are respectively R2, R2.5, R3 and R3.5; and the right motor 36 is mounted on the right sliding block 34, the output end of the right motor 36 is connected with the right cutter head 37, four rim burr cutters are circumferentially and uniformly distributed on the right cutter head 37, and the cutting edge fillets 43 of the burr cutters are respectively R2, R2.5, R3 and R3.5. According to the requirements of different outer rim fillets 42, the same matched cutting edges are selected on the left and right sides to remove burrs, and the left cutter head 32 and the right cutter head 37 jointly constitute a rim burr removing cutter system. The electric cylinder 38 is mounted right below the rotating disk 27, and the circle center detection probe 39 is mounted at the output end of the electric cylinder 38 and used for detecting the circle center of the cap section part 40.

The working process of the device is: when a wheel arrives at the device along the roller bed, the positioning cylinder 21 is started, the left sliding table 22 and the right sliding table 23 move synchronously, and the four positioning wheels 25 can initially position the wheel; when the wheel is initially positioned, the positioning wheels 25 are withdrawn and reset; then the lifting cylinder 11 is started to drive the flange plate 16 and the expansion sleeve 17 to ascend; when the flange plate 16 contacts the flange surface of the wheel, the expansion cylinder 15 is started, the expansion core 18 drives the expansion sleeve 17 to expand, and the wheel is positioned and clamped based on the flange surface of the central hole. Next, the lifting cylinder 11 drives the wheel to continue ascending and leave the roller bed, the wheel stops moving after ascending to a certain height, at the moment, the electric cylinder 38 is started to drive the circle center detection probe 39 to descend to the interior of the cap section of the wheel, and the circle center detection probe 39 is reset after detecting the position of the circle center; then a computer calculates the coaxiality deviation between the axis of the central hole and the axis of the cap section, the transverse deviation value and the longitudinal deviation value are fed back to the coaxiality correction system, the central axes of the cap sections of the wheel are adjusted via the longitudinal servo motor 4 and the transverse servo motor 7 to superpose with the rotating centers 44 of the cutters, and when the central axis 41 of the cap sections of the wheel are superposed with the rotating centers of the cutters, the rotating center of the burr part of the outer rim of the wheel is also superposed with the rotating centers of the cutters, so that high-precision positioning is realized. Next, the servo motor 26 is started to drive the cutter system to rotate, the lifting cylinder 11 is continuously started to drive the wheel to ascend to an appropriate height, and the burr part of the outer rim contacts the fillet cutting edges of the burr cutters to remove burrs.

According to the disclosure, the wheel is initially positioned and clamped by adopting the central hole, then the coaxiality deviation of the center hole and the cap sections is eliminated, and the rotating center of the burr part of the outer rim is superposed with the rotating centers of the cutters, so that high-precision burr removal is realized. The device has the characteristics of advanced process, stability, high efficiency, high degree of automation and the like.

The invention claimed is:

1. A high-precision wheel rim burr removing device, being composed of a rack, a base, longitudinal guide rails, a longitudinal servo motor, a first ball screw, a longitudinal moving plate, a transverse servo motor, transverse guide rails, a second ball screw, a transverse moving plate, a lifting cylinder, guide posts, a lifting platform, an expansion cylinder, a flange plate, an expansion sleeve, an expansion core, a supporting plate, a positioning guide rail, a positioning cylinder, a left sliding table, a right sliding table, a gear rack, positioning wheels, a servo motor, a rotating disk, a left guide rail, a left sliding block, a left cylinder, a left motor, a left cutter head, a right guide rail, a right sliding block, a right cylinder, a right motor, a right cutter head, an electric cylinder and a circle center detection probe, wherein the positioning guide rail is mounted on the supporting plate, the left sliding table and the right sliding table are symmetrically mounted on the positioning guide rail and connected via the gear rack, an output end of the positioning cylinder is connected with the left sliding table, the positioning wheels are mounted on the left sliding table and the right sliding table;

the base is mounted at a bottom of the rack, the longitudinal guide rails are mounted on the base, the longitudinal moving plate is mounted on the longitudinal guide rails, and the first ball screw is mounted below the longitudinal moving plate, an output end of the longitudinal servo motor is connected with the first ball screw, thus controlling longitudinal movement of the longitudinal moving plate, the transverse guide rails are mounted on the longitudinal moving plate, the transverse moving plate is mounted on the transverse guide rails, and the second ball screw is mounted below the transverse moving plate, an output end of the transverse servo motor is connected with the second ball screw, thus controlling transverse movement of the transverse moving plate;

the lifting cylinder and the guide posts are mounted on the transverse moving plate, and an output end of the lifting cylinder is connected with the lifting platform to control ascending and descending of the lifting platform, the expansion cylinder and the flange plate are fixed on the lifting platform, an output end of the expansion cylinder is connected with the expansion core, the expansion core is fitted within the expansion sleeve;

the servo motor is mounted at a top of the rack, an output end of the servo motor is connected with the rotating disk, the left guide rail and the right guide rail are symmetrically mounted on the rotating disk, the left sliding block and the right sliding block are mounted on left guide rail and the right guide rail, respectively, the left cylinder and the right cylinder are symmetrically fixed on the rotating disk, an output end of the left cylinder is connected with the left sliding block, and an output end of the right cylinder is connected with the right sliding block;

the left motor is mounted on the left sliding block, an output end of the left motor is connected with the left cutter head, four rim burr cutters are circumferentially and uniformly distributed on the left cutter head, and fillet cutting edges of the four rim burr cutters distributed on the left cutter head are respectively capable of cutting a different size fillet, the right motor is mounted on the right sliding block, an output end of the right motor is connected with the right cutter head, four rim burr cutters are circumferentially and uniformly distributed on the right cutter head, and fillet cutting edges of the four rim burr cutters distributed on the right cutter head are respectively capable of cutting a different size fillet, the left cutter head and the right cutter head jointly constituting a rim burr removing cutter system, the electric cylinder is mounted below the rotating disk, and the circle center detection probe is mounted at an output end of the electric cylinder and used for detecting a circle center of a cap section part of a wheel, and a central axis of the cap section part capable of being adjusted via the longitudinal servo motor and the transverse servo motor to superpose with a rotating center of the left cutter head and the right cutter head.

\* \* \* \* \*